Figure 1:
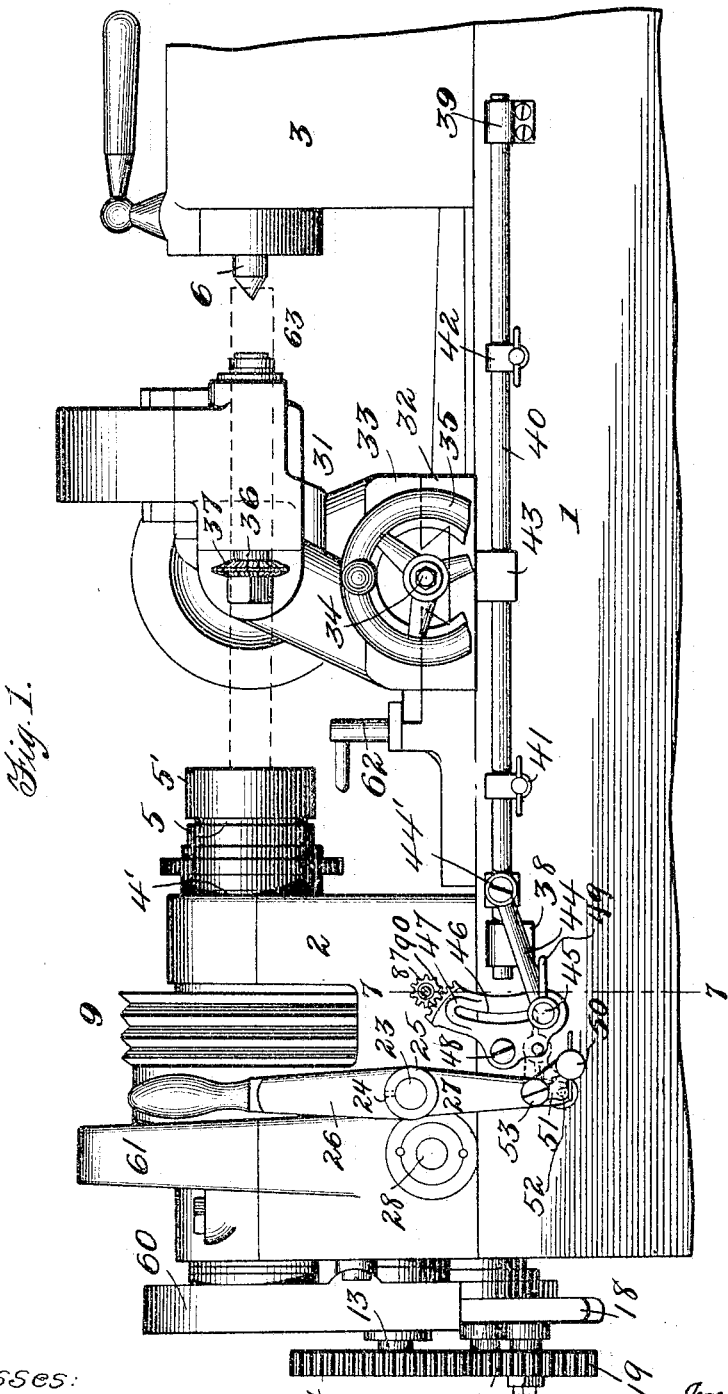

No. 782,237. PATENTED FEB. 14, 1905.
B. M. W. HANSON.
MACHINE FOR CUTTING SPIRALS.
APPLICATION FILED FEB. 6, 1903.
6 SHEETS—SHEET 1.

Witnesses:
F. G. Campbell.
Frances E. Blodgett.

Inventor:
B. M. W. Hanson.
By his Attorneys.
Blodgett & Peck

No. 782,237. PATENTED FEB. 14, 1905.
B. M. W. HANSON.
MACHINE FOR CUTTING SPIRALS.
APPLICATION FILED FEB. 6, 1903.
6 SHEETS—SHEET 2.
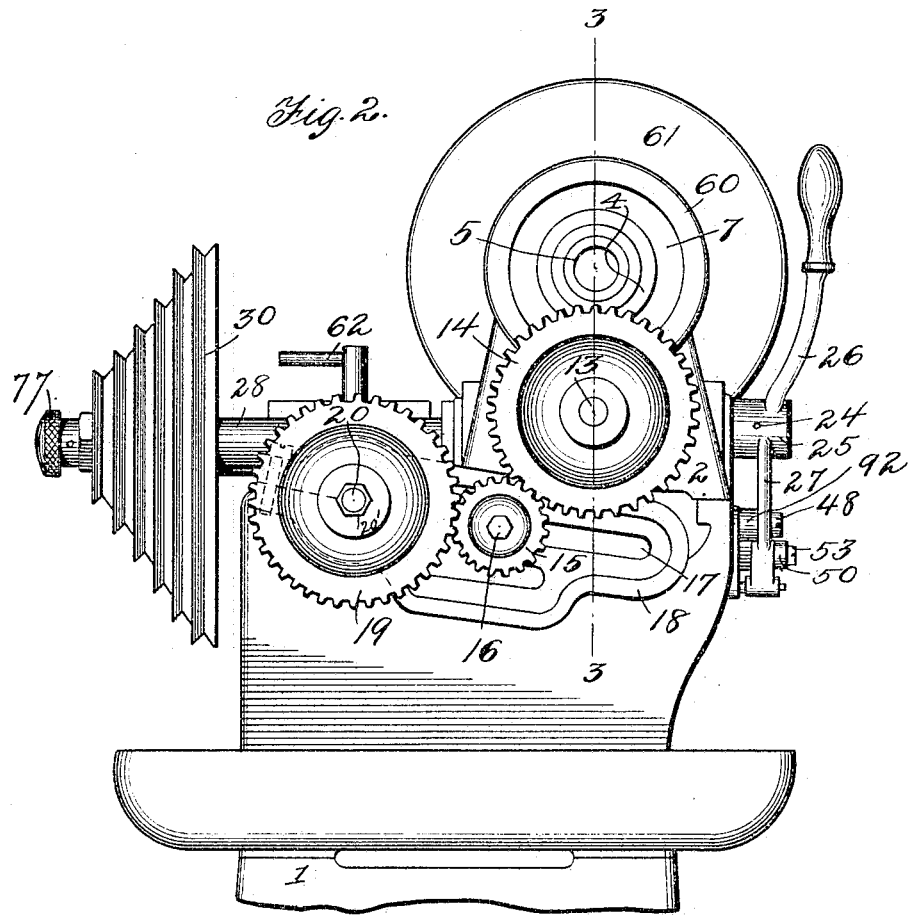
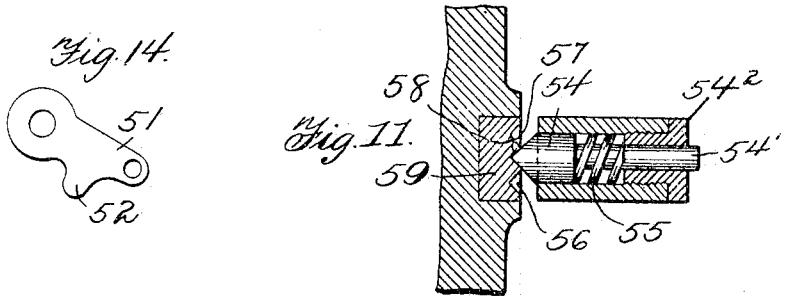
Witnesses:
F. G. Campbell.
Frances E. Blodgett.
Inventor:
B. M. W. Hanson.
By his Attorneys:
Blodgett & Peck

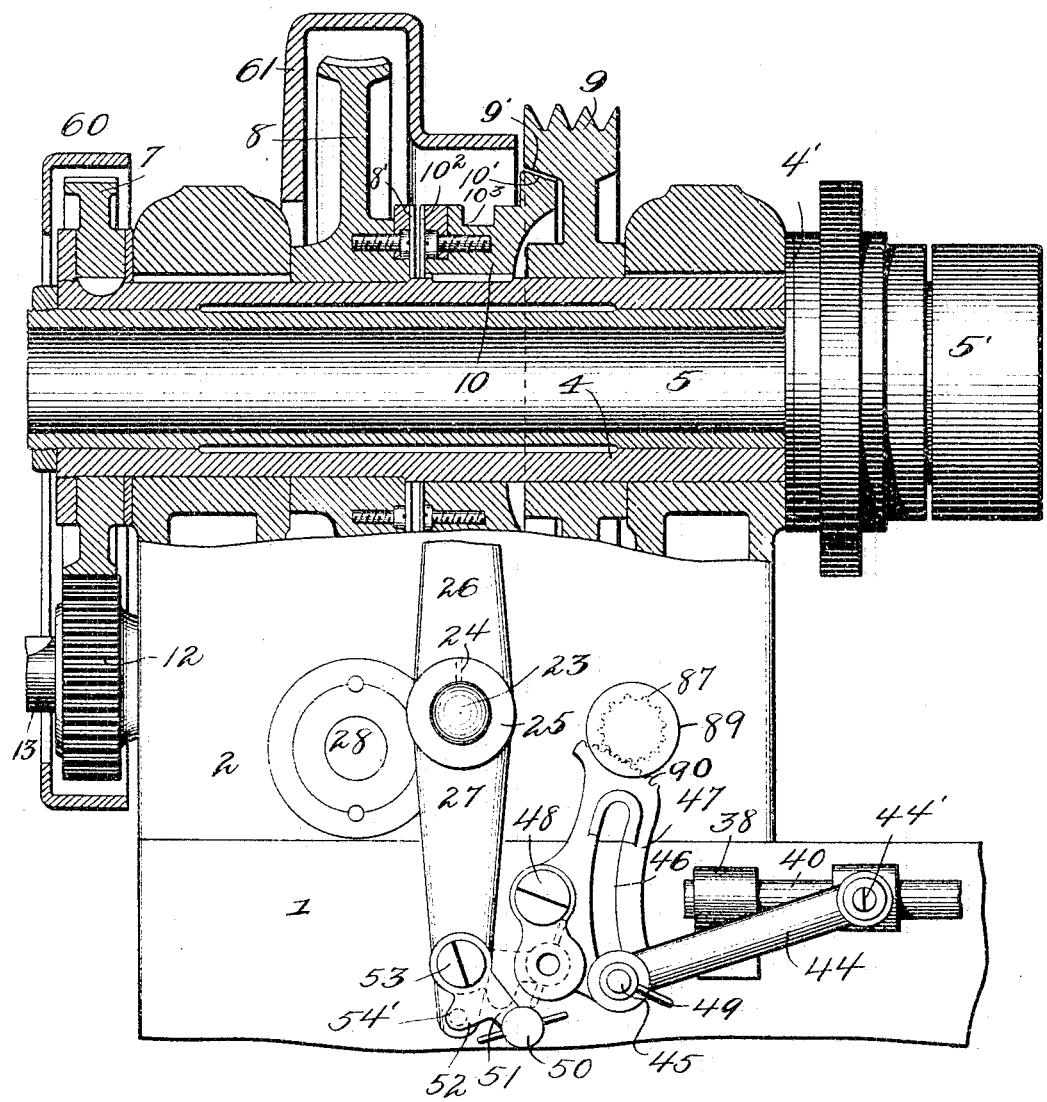

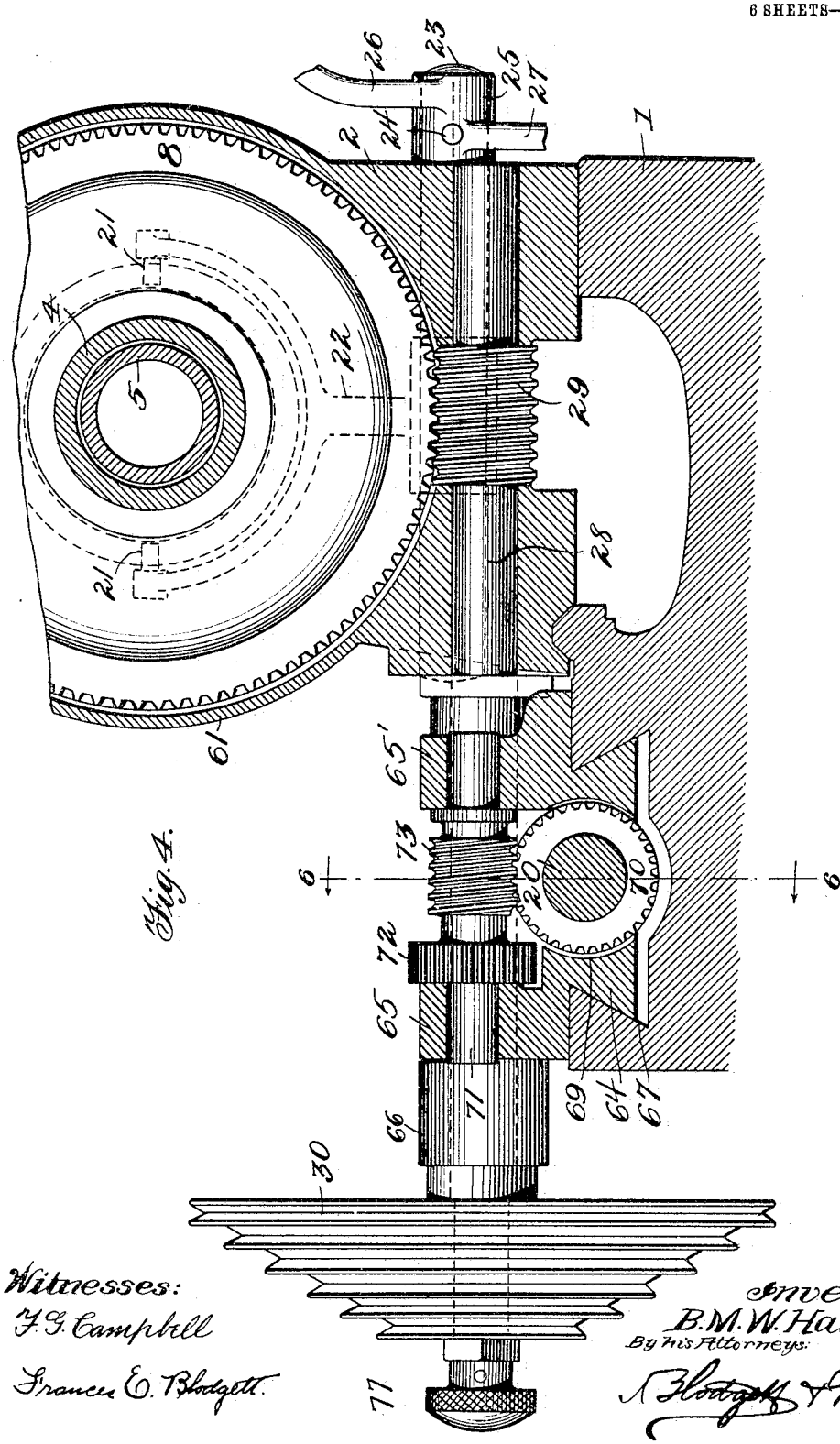

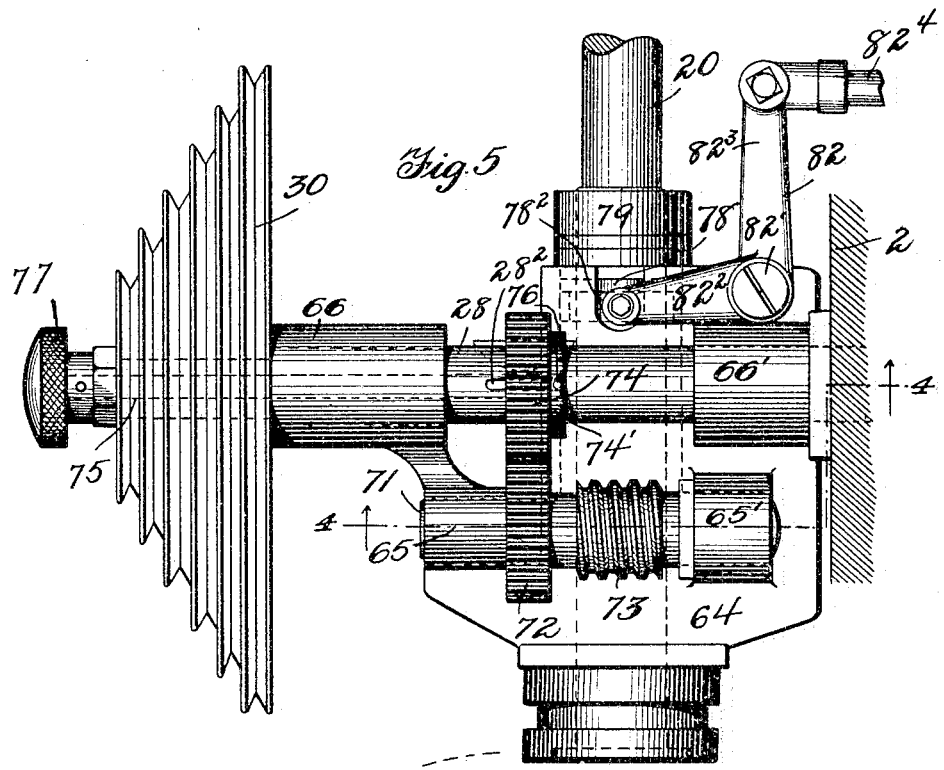
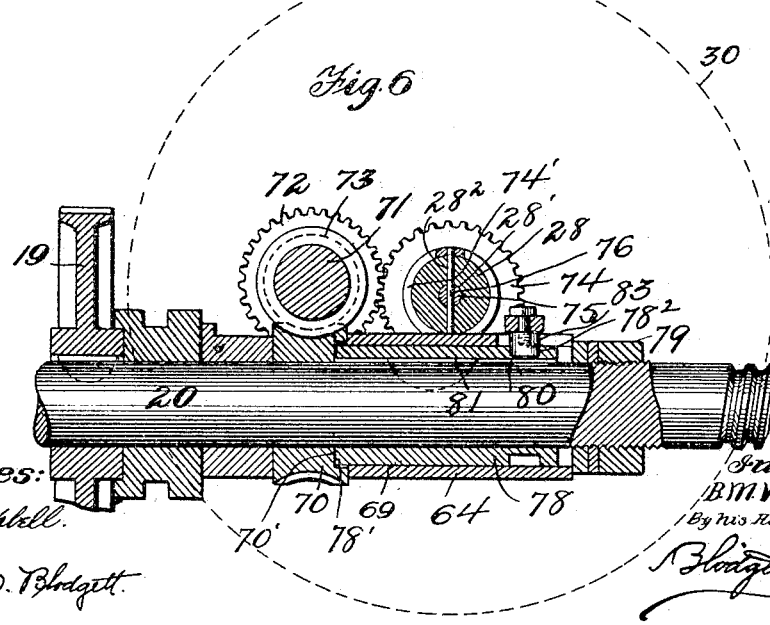

No. 782,237. PATENTED FEB. 14, 1905.
B. M. W. HANSON.
MACHINE FOR CUTTING SPIRALS.
APPLICATION FILED FEB. 6, 1903.
6 SHEETS—SHEET 6.
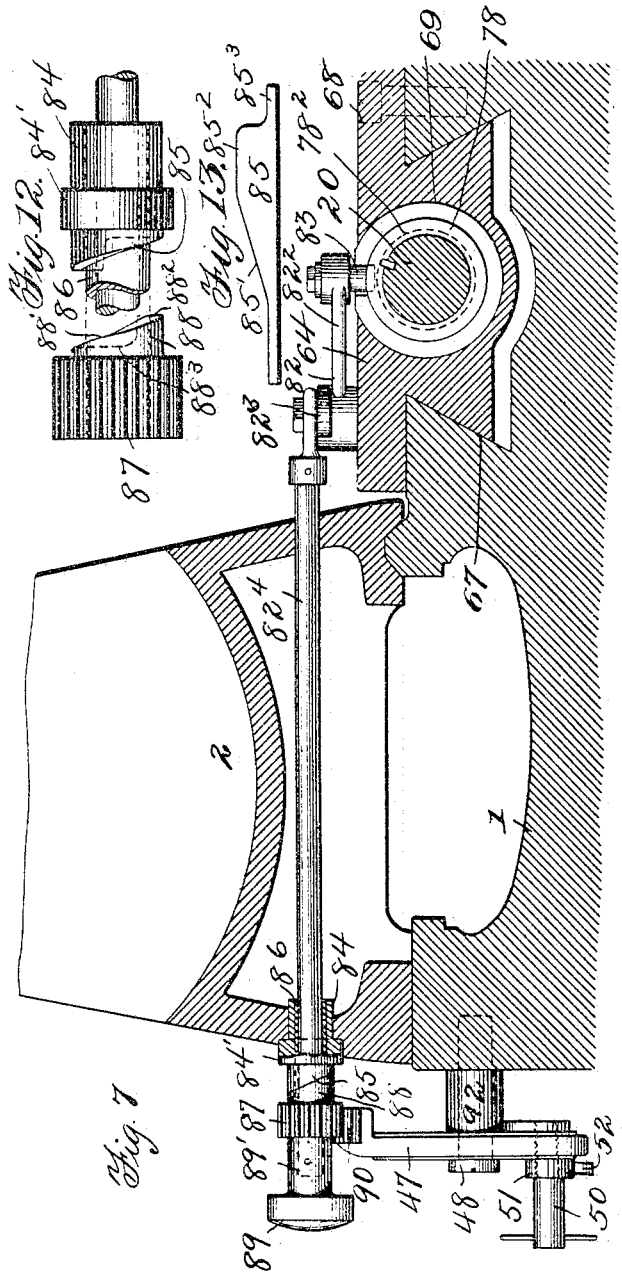
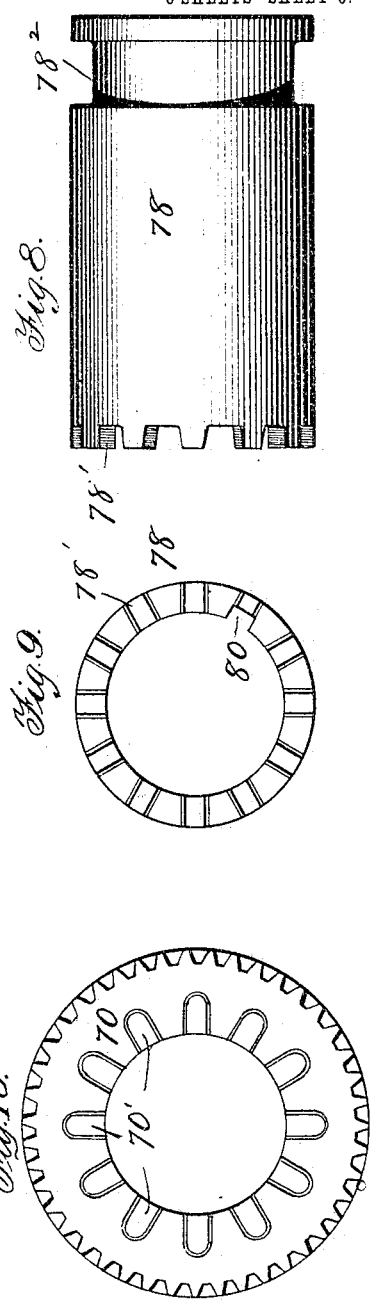
Witnesses:
F. G. Campbell.
Frances E. Blodgett.
Inventor:
B. M. W. Hanson.
By his Attorneys:
Blodgett & Peck No. 782,237.                                          Patented February 14, 1905.

UNITED STATES PATENT OFFICE.

BENGT M. W. HANSON, OF HARTFORD, CONNECTICUT, ASSIGNOR TO PRATT AND WHITNEY COMPANY, OF HARTFORD, CONNECTICUT, A CORPORATION OF NEW JERSEY.

MACHINE FOR CUTTING SPIRALS.

SPECIFICATION forming part of Letters Patent No. 782,237, dated February 14, 1905.

Application filed February 6, 1903. Serial No. 142,112.

*To all whom it may concern:*

Be it known that I, BENGT M. W. HANSON, a citizen of Sweden, residing at Hartford, in the county of Hartford and State of Connecticut, have invented certain new and useful Improvements in Machines for Cutting Spirals, of which the following is a specification.

My invention relates to machines for forming either right or left hand threads or spirals in metal; and it has for its object various improvements in such machines, as will be hereinafter described.

In making a fine thread the spindle necessarily turns much faster than the lead-screw, while in forming a thread of coarse pitch the lead-screw must turn more rapidly than the spindle. When in making a thread or spiral of coarse pitch the lead-screw is driven from the spindle, the strain on said spindle, the mechanism connecting it with the lead-screw, and said lead-screw is severe, and it is often impossible to form threads of required pitches in the same machine without changing its structure and interposing gears in the lead-screw train, which requires a vexatious loss of time and labor and enhanced expense. If, on the other hand, the lead-screw is driven directly, power is applied to a point of great resistance and, through suitable proportionate gearing, is transmitted from the lead-screw to the live spindle, and strain and friction incident to the common construction are avoided, the result being a machine by which threads or spirals of any desired pitch may be produced and in which the objectionable leverage incident to the employment of a number of gears in the train between the live-spindle and lead-screw, when said lead-screw is driven from the spindle, is obviated.

Primarily the object of the invention is the provision, in a machine for cutting threads or spirals, of means of any suitable kind by which the lead-screw may either be driven directly and transmit its motion to the live-spindle or indirectly through the usual gear-train connecting said spindle and lead-screw.

A further object of the invention is the provision of clutches for so controlling the elements of the mechanism that the lead-screw may either be driven direct and, through its speed-gear train, actuate the live-spindle or driven indirectly by said live-spindle and gear-train.

A further object of the invention is the provision of improved mechanism for stopping the movement of the carriage at the limit of its stroke.

Other objects of the invention will be set forth in the following description.

In the accompanying drawings, Figure 1 is a side elevation of a machine embodying my improvements. Fig. 2 is an end view of said machine. Fig. 3 is a longitudinal vertical section on line 3 3 of Fig. 2. Fig. 4 is a transverse section of the machine taken on line 4 4 of Fig. 5. Fig. 5 is a plan view of the mechanism employed for directly driving the lead-screw. Fig. 6 is a section on line 6 6 of Fig. 4 looking in the direction of the arrow. Fig. 7 is a section on line 7 7 of Fig. 1. Fig. 8 is a side elevation of a clutch-sleeve employed. Fig. 9 is an end view of said clutch-sleeve; and Fig. 10 is a face view of a worm-wheel, showing the clutch-surface with which the clutch-sleeve coacts. Fig. 11 is a sectional view of the lever-arm and a part of the bed to show the notched plate and spring-actuated plunger coöperating with said plate. Fig. 12 is a detail view of parts hereinafter described. Fig. 13 is a view of one of the cams developed, and Fig. 14 is a view of the link connecting an arm of the clutch-lever with the pivoted lever of the "link-motion."

Like characters designate similar parts throughout the several views.

Referring to the drawings, the numeral 1 designates the frame or bed of the machine, which may be of any suitable kind. Upon ways of this bed are adjustably mounted heads 2 and 3, the former containing a tubular live-spindle 4 and a tubular chuck-spindle 5, having a chuck-head 5', in which a split or other form of chuck (not shown) may be mounted, and the latter the usual adjustable center 6. At its inner end the hollow spindle is provided with a flange 4', abutting against the side of the bearing in the head-stock. Keyed to the outer end of the live-spindle adjacent to its rear bearing is a gear-wheel 7, and loosely mounted on said spindle are a worm-wheel 8 and a grooved pulley 9, while splined to the spindle intermediate this worm-wheel and pulley is a movable clutch 10, having a friction-surface 10' on one side, adapted to engage a complemental surface 9' in the pulley 9, and a toothed surface $10^2$, adapted to be thrown into contact with a similar surface 8' on the worm-wheel 8, as shown in Fig. 3.

In mesh with gear 7 is a gear 12, secured to a shaft 13, to the other end of which is keyed a gear 14 in mesh with a pinion 15, mounted on a stud 16, adjustable in a slot 17 of a pivoted carrier 18, said pinion driving a gear 19, secured to the lead-screw shaft 20, whereby said screw may be driven from the live-spindle when desired, and the required speed thereof may be obtained by employing a pinion 15 of the necessary number of teeth.

In the movable clutch 10 is formed a groove $10^3$ for the reception of pins 21 on the yoke-shaped end of a lever-arm 22, projecting from a rock-shaft 23, extending transversely of the head-stock 2 and journaled in bearings thereof. Sleeved upon this rock-shaft and secured thereto by a pin 24 is a hub 25, from which project, respectively, in opposite directions a hand-lever 26 and a lever-arm 27, said arm 27 being detachably connected to mechanism controlled by the cutter-carriage hereinafter described.

Located transversely of and journaled in the head 2 is a shaft 28, carrying a worm 29, engaging the worm-wheel 8, and secured to an end of said shaft is a conical belt-pulley 30, having a series of grooves of different diameters, so that the desired speed may be imparted to the worm-shaft to drive the spindle 4 in the manner required for the kind and pitch of worm, thread, or spiral groove or slot to be made.

Designated in a general way by 31 is a slide or carriage mounted for reciprocatory movement upon the lathe-bed and carrying a nut of any suitable kind with which the threads of the lead-screw 20 engage. This slide consists of a bed-plate 32, fitted for sliding engagement with the bed, and a cutter-slide or carriage 33, transversely movable upon said bed-plate by means of a screw 34, actuated by a hand-wheel 35. In this cutter-slide is mounted a shaft 36, carrying a milling-cutter 37, said shaft being driven in any suitable manner. This arrangement is one of many that could be adopted, the invention not being limited to any particular device for acting upon the work.

In brackets 38 and 39, secured to the bed 1, is mounted a shifting-rod 40, carrying adjustable stops 41 and 42 of any suitable kind, said stops coöperating with a lug 43, depending from the tool-carriage, as shown in Fig. 1.

Articulated to the shifting-rod 40 at 44' is a link 44, having a wrist-pin 45 fitted in a curved slot 46 of a lever 47, pivoted at 48 to the frame. A lever-screw 49 serves to retain this wrist-pin when set at any desired place in the slot. Secured by a screw 50 to the lower part of lever 47 is a link 51, having a wing or extension 52, said link being connected to the lever-arm 27 by a screw 53 and being shown in normal position when the lead-screw is driven from the live-spindle by dotted lines in Figs. 1 and 3. Fitted in a bore in the lower end of lever-arm 27 is a conical detent 54, having a shank 54' passing through a screw $54^2$, and between the end of said screw and the head of the detent is a spring 55, which presses said detent inward to cause its nose to engage any one of the series of notches 56, 57, and 58, respectively, in a plate 59, located in a recess of the frame, as shown in Fig. 11. When the clutch 10 is thrown into engagement with belt-pulley 9, arm 27 is shifted to the left and the detent snaps into notch 56. When shifted to engage worm-wheel 8, said lever-arm is moved to the right and the detent engages notch 58, and when said clutch is thrown to a neutral position the detent holds the parts in the positions shown in Fig. 3, and the worm-wheel 8 and pulley 9 revolve idly upon the spindle 4. This slotted lever 47 and the parts connecting it with the lever-arm 27 and shifting-rod 40 constitute a link-motion for shifting the clutch to a neutral position at the limit of each stroke of the tool-carriage, hence stopping the movement of said carriage.

For protecting the gears 7, 8, and 12 and clutch 10 hoods 60 and 61 may be employed, if desired.

It is sometimes necessary to clamp the cutter-slide 33 securely against movement, and to accomplish this result a binder-screw 62, tapped into the slide, may be employed, as shown in Fig. 1.

In the operation of my improved machine as thus far described the lead-screw is driven from the live-spindle 4, and stock 63 being clamped in the chuck and its end in contact with center 6, as shown by dotted lines in Fig. 1, the cutter 36 is adjusted to the proper angle, and the machine is set in motion by grasping lever 26 and shifting the clutch 10 into contact with the toothed surface 8' of worm-wheel 8, thus connecting said wheel to the spindle and through the gearing described actuating the lead-screw 20, which engaging the nut of the carriage will cause the cutter slowly to advance from right to left in the illustration Fig. 1 until the lug 43 comes into contact with the stop 41, shifts the rod 40, and through the link motion and connections described throws the clutch out of engagement with worm-wheel 8 and to the neutral position illustrated in Fig. 3, thus stopping the tool-carriage. If it is desired to make an additional cut in the work, the slide 33 is withdrawn to clear the cutter from the work, and the clutch is then shifted by the means described to throw it into contact with belt-pulley 9, which rotates at a greater speed than worm-wheel 8, thus connecting said pulley to the spindle 4 and through the gear-train set forth rapidly rotating the lead-screw and causing the cutter-carriage to return quickly until the lug 43 strikes stop 42 and again shifts the rod 40 to throw the clutch to its neutral position.

As thus far described the machine is similar to that set forth in my application filed July 12, 1902, Serial No. 115,337, in which the lead-screw is driven from the spindle, and no claim is herein made to the parts of said machine except as they coact with other elements to be hereinafter set forth.

For reasons above given it is a desideratum to avoid the strain and friction incident to the driving of the lead-screw in the manner just described, and especially is this true in cutting spirals of certain pitches, and means will now be described whereby the lead-screw may be driven directly and the live-spindle indirectly from said lead-screw.

When it is desirable to drive the lead-screw directly and to actuate the live-spindle from said lead-screw, lever 26 is manipulated to throw the clutch 10 to its neutral position, the detent 54 then snapping into the central notch 57 of plate 59, as shown in Fig. 11. Screw 50 is then withdrawn from its seat in lever-arm 47, and the link 51 is swung downward until its lug 52 covers the stem 54' of the detent 54, thereby locking said detent against accidental displacement, as illustrated by full lines in Fig. 3. Power is now applied to pulley 30 on shaft 28, which by its worm 29 causes the worm-wheel 8, now loose on the live-spindle, to rotate idly without imparting motion to said spindle.

Designated by 64 is a slide or carriage provided with bearings 65 65' and 66 66'. This slide is fitted in a guideway 67 of the bed and is secured, after it has been properly adjusted, by means of a screw or equivalent device 68, (shown by dotted lines in Fig. 7,) and it is provided with a longitudinal passage 69 for the reception of the lead-screw 20, a worm-wheel 70, and a clutch hereinafter described.

Journaled in the bearings 65 65' is a shaft 71, carrying a pinion 72 and a worm 73, the latter engaging the worm-wheel 70, while the shaft 28 passes through the bearings 66 and 66', said shaft having a longitudinal bore 28' and a slot 28², communicating with said bore. Mounted for sliding movement on said shaft 28 is a pinion 74, and located in the bore 28' is a rod 75, connected by a pin 76, passing through the slot 28², to the hub 74' of the pinion, as shown in Figs. 5 and 6, said rod having at its outer end a knob or handle 77, by means of which it may be manipulated to throw the pinion either into or out of gear with the pinion 72 of the worm-shaft 71.

In the passage 69 of carriage 64 is mounted a clutch-sleeve 78, having teeth 78' at one end and a groove 78² adjacent to its opposite extremity, said clutch-sleeve surrounding and being movable upon the lead-screw shaft 20 and being limited in its play by collars and washers 79, as shown in Fig. 6. In the inner face of the worm-wheel 70 are formed recesses 70', with the walls of which the teeth 78' are adapted to engage when the clutch-sleeve is shifted. This clutch-sleeve is grooved at 80 to fit over a key 81, which connects it to rotate with the lead-screw shaft, but permits of its movement toward and from the worm-wheel. For actuating this clutch-sleeve any suitable means may be employed, and I have found useful for this purpose a bell-crank lever 82, pivoted to the carriage 64 at 82', one arm, 82², of which lever carries a pin or roller 83, entering the circumferential groove 78² in said sleeve, and the other arm, 82³, of which is articulated to a rod 82⁴, passing through the head-stock 2, as shown in Fig. 7.

Mounted in the side of the head-stock 2 is a tubular bushing 84, having a flange 84', from which projects a cam 85, having a spiral face. A development of this cam is illustrated in Fig. 13, and, as shown by said figure and by Fig. 12, it is provided with a spiral gradually-rising surface 85', terminating in a straight portion 85² and then abruptly dropping to a flat locking part 85³.

Driven into the bore of bushing 84 is a sleeve 86, and upon this sleeve is mounted a pinion 87, having projecting from it a cam-hub 88, provided with a spiral gradually-rising end portion 88', terminating in a straight part 88², and then, like the complemental cam 85, abruptly descending to a flat locking-surface 88³. (Shown by dotted lines in Fig. 12.)

To the end of rod 82⁴ is keyed the hub 89' of a knob or push-button 89, in virtue of which the rod 82⁴ may be actuated by hand to shift the clutch 78 when desired, and the pinion 87 may also be actuated in the same manner to throw the cam-surfaces into their locked position.

As illustrated in Figs. 1, 3, and 7, the pivoted lever 47 is provided, preferably, on its upper surface with a rack 90 in engagement with the pinion 87, and said pivoted lever is mounted for swinging movement upon bolt 48, projecting from the frame, and is spaced at the proper distance from said frame by a short sleeve 92.

When it is desired to drive the lead-screw directly and the live-spindle from said lead-screw, power is applied to shaft 28 by belting on pulley 30, and knob 77 is grasped and pushed inward to cause rod 28' to slide pinion 74 into mesh with pinion 72 of shaft 71, carrying the worm 73, thereby causing said worm to drive the worm-wheel 70, which is now connected to the lead-screw shaft 20 by the clutch 78, as shown in Fig. 6. When this action has been accomplished, the cutter-carriage 32 has been adjusted to the right and the cutter preferably set at the required angle to the stock by the means set forth in my application aforesaid or by other means that may be selected, and the lead-screw now being in motion the tool-carriage advances at the speed required and through the gearing 19, 15, 14, 12, and 7 drives the live-spindle 4 and chuck-spindle 5, thus rotating the stock and traversing the carriage until the lug 43 strikes stop 41 and through the rod 40, link 44, and lever 47 and its rack 90 actuates the pinion 87 and causes the cam 88 to rotate against the stationary cam 85, and thus draw back the rod $82^4$ to shift the lever 82 and through it the clutch 78 out of engagement with the clutch-face of the worm 70, thereby stopping the motion of the lead-screw and the gears connecting the same with the live-spindle. When threads or spirals of steep pitch—for instance, one-inch lead and upward—are being formed, the carriage may be returned to the initial end of the cut by hand by applying a crank-wrench to the squared end 20′ of the lead-screw 20.

In the drawings the machine is shown arranged to form right-hand threads or spirals; but it can readily be adapted to form left-hand threads by placing an additional idler-gear in the train between the spindle and lead-screw and by turning the head in which the cutter-spindle is journaled over to the opposite angle. When for any reason it is desired to cut from left to right or toward the tail-stock, this may be done by reversing the direction of rotation of the lead-screw and by shifting the wrist-pin of link 44 to the upper end of the slot in pivoted lever 47, the stop 42 being of course set at the desired point to actuate the clutch mechanism and stop the feed when the lug 43 of the carriage engages said stop.

By the means described either right or left hand threads or spirals of any desired pitch or spiral slots in tubing for the manufacture of springs may be readily made, thus providing a universal machine for the purposes mentioned.

Changes may be made in the location and arrangement of the parts and other means may be employed for driving the lead-screw directly and for connecting it with the live-spindle. Clutches different from those shown may also be employed, and the means for actuating the clutch, gear, and cutter elements of the machine may be modified without departure from the invention.

Having thus described my invention, what I claim is—

1. The combination, with a carriage, of means for reciprocating said carriage; a spindle; and mechanism whereby either said means for reciprocating the carriage may be actuated by the spindle, or the spindle may be rotated by the carriage-actuating means.

2. A metal-working machine comprising the following instrumentalities in combination: a rotary spindle; a tool-carriage; a lead-screw; mechanism for driving said lead-screw from the spindle; means for throwing a part of said mechanism into and out of operation; mechanism for directly driving the lead-screw, and thereby also driving that connecting the spindle and lead-screw; and means for throwing the mechanism for directly driving the lead-screw into and out of action, whereby the lead-screw may be driven from the spindle, or the spindle may be driven from the lead-screw.

3. The combination, with a rotary spindle, of a tool-support; a lead-screw for actuating the tool-support; a gear-train connecting the spindle and lead-screw; a gear loose on the spindle; a clutch for connecting said gear to and disconnecting it from said spindle; a gear-train for directly driving said lead-screw; and a clutch for connecting an element of the directly-driving gear-train to and disconnecting it from said lead-screw.

4. The combination, with a rotary spindle, of reversely-driven elements loose on said spindle; a clutch connected to said spindle; means for throwing said clutch into engagement with either of said reversely-driven elements; a tool-carriage; a lead-screw; gearing connecting the lead-screw and spindle; gearing for directly driving said lead-screw; and means for connecting said directly-driving gearing to and disconnecting it from the lead-screw.

5. The combination, with a rotary spindle, of a clutch in sliding connection with said spindle; means for shifting the clutch; a driving element loose on the spindle, and with which the clutch may be engaged; instrumentalities for actuating the clutch-shifting means; a device for connecting and disconnecting an element of said clutch-shifting means with one of its actuating instrumentalities; a carriage; a lead-screw; means controlled by the carriage for shifting the clutch; means for directly driving the lead-screw; a clutch in said means; and devices also controlled by the carriage for shifting said clutch.

6. The combination, with a tool-carriage, of a lead-screw for actuating said carriage; a gear loose on the lead-screw shaft; a clutch for connecting the gear to said lead-screw shaft; means for actuating the clutch to throw it into engagement with the gear; means for driving said gear; means controlled by the tool-carriage for throwing the clutch out of engagement with said gear; a rotary spindle; reversely-driven elements loose on said spindle; a clutch in sliding connection with the spindle between said elements; lever mechanism for shifting said clutch; and a device for connecting and disconnecting an element of said lever mechanism with an element of the clutch-shifting means controlled by the tool-carriage.

7. The combination, with a tool-carriage, of a lead-screw; a worm-wheel loose on the shaft of said lead-screw; a worm in engagement with the worm-wheel; a clutch for connecting the worm-wheel to the lead-screw shaft; means for actuating said clutch; a live-spindle; and reversely-driven elements loose on said spindle; a clutch in sliding connection with the spindle between said elements; clutch-shifting devices; means controlled by the carriage for actuating said devices; and means for connecting and disconnecting one of said devices with an element of said clutch-shifting means controlled by the carriage.

8. The combination, with a tool-carriage, of a lead-screw; a live-spindle; gearing connecting the lead-screw and live-spindle; a gear loose on the lead-screw shaft; a clutch for connecting said gear to said shaft; means for directly actuating said gear; means for throwing the clutch into engagement with the gear; a rotary cam; means controlled by the tool-carriage for actuating said rotary cam; a stationary cam coöperating with the rotary cam; and means actuated by said rotary cam for disengaging the clutch and gear on the lead-screw shaft.

9. The combination, with a tool-carriage, of a lead-screw for actuating said carriage; a sleeve in sliding engagement with the lead-screw shaft, and having a clutch-surface at its end; a gear loose on the lead-screw shaft, and having a clutch-surface; means for shifting said sleeve into engagement with the gear to thereby lock the same to the shaft; means for shifting said sleeve out of engagement with the gear; means for driving the gear; a live-spindle; and gearing for driving said live-spindle from the lead-screw or for driving the lead-screw from the live-spindle; a driving element loose on the live-spindle; and a clutch for connecting said driving element to said live-spindle and for disconnecting it therefrom.

10. The combination, with a tool-carriage, of a lead-screw for actuating said carriage; a worm-gear loose on the lead-screw shaft, and having a clutch-surface; a worm for driving the worm-wheel; mechanism including a shiftable gear for driving the worm; means for shifting said gear, a clutch-sleeve in sliding engagement with the lead-screw shaft; a lever for reciprocating said clutch-sleeve; a shifting-rod; a stop on said rod; means operated by the rod for shifting the lever to throw the clutch-sleeve in one direction; and means for shifting the clutch in the opposite direction.

11. The combination, with a tool-carriage, of a lead-screw for actuating said carriage; a gear loose on the lead-screw shaft; mechanism, including a shiftable gear, for actuating said loose gear; means independent of the work-spindle for actuating said mechanism; means for connecting the loose gear to and disconnecting it from said lead-screw shaft; a work-spindle; and means controlled by the lead-screw for rotating said work-spindle.

12. The combination, with a tool-carriage, of a lead-screw for actuating said carriage; means for driving the lead-screw; a clutch constituting an element of said means; a pair of cams, one of which is stationary and the other rotary; means for connecting the rotary cam with the clutch; and means controlled by the carriage for actuating said rotary cam.

13. The combination, with a tool-carriage, of a lead-screw for actuating the carriage; gearing including a clutch for actuating said lead-screw directly; means including a clutch for driving the lead-screw indirectly; and means controlled by the carriage for shipping either of said clutches.

14. The combination, with a tool-carriage, of a lead-screw for actuating said carriage; gearing for driving said lead-screw directly; a clutch for connecting an element of said gearing to the lead-screw shaft; a shifting-rod; a stop on said shifting-rod; a device on the tool-carriage adapted to engage said stop; a rotary cam; a stationary cam; means connecting said rotary cam with the clutch; and means controlled by the shifting-rod for actuating said rotary cam.

15. The combination, with a tool-carriage, of a lead-screw for actuating said carriage; a gear loose on the lead-screw; a clutch in sliding engagement with said lead-screw; means for shifting the clutch into engagement with said loose gear; means controlled by the carriage for automatically shifting the clutch out of engagement with the loose gear; a live-spindle; a driving element loose on said spindle; a clutch for locking said element to the spindle; and mechanism connecting the lead-screw and said live-spindle.

16. In a machine of the class specified, the combination, with a tool-carriage, and with a lead-screw for actuating said tool-carriage; of a live-spindle; a pair of driving elements on said spindle; a clutch mounted for sliding movement on the spindle between said driving elements; means for actuating the clutch; a device on the carriage for controlling said clutch-actuating means; a gear-train connecting the live-spindle and lead-screw; means for driving the lead-screw directly and through said train of gears the live-spindle when the clutch on said spindle is in a neutral position; means for throwing the direct lead-screw drive out of action; and devices for actuating said means.

17. The combination, with a live-spindle, of a pair of driving elements loose on said spindle; means for clutching either of said driving elements to the spindle; a tool-carriage; a lead-screw; gearing connecting the lead-screw and the live-spindle; mechanism for driving the lead-screw directly and thereby imparting motion therefrom through the gearing to said live-spindle; a clutch in said mechanism; and means for shifting the clutch.

18. In a machine of the class specified, the combination, with a live-spindle, and with means for driving said spindle; of means for disconnecting the spindle-drive; a carriage; a lead-screw for reciprocating the carriage; a direct drive for the lead-screw; mechanism for disconnecting the direct drive from said lead-screw; and means for driving the spindle from the lead-screw.

19. The combination, with a live-spindle, of driven elements loose on said spindle; a clutch in sliding connection with the spindle; means for actuating the clutch to throw it into engagement with either of said driven elements or to a position intermediate said elements; a tool-carriage; a lead-screw for actuating said tool-carriage; means for driving the lead-screw directly; means for disconnecting the direct lead-screw drive; and means for driving the live-spindle from said lead-screw.

20. The combination, with a carriage, of a lead-screw for actuating said carriage; a spindle; means, including a shiftable clutch, for driving said spindle; means for driving the lead-screw from the spindle; means for directly driving the lead-screw; and means for throwing into and out of action the direct lead-screw-driving mechanism.

21. The combination, with a live-spindle, of means for driving said spindle; a clutch for connecting said means to the spindle; a carriage; a lead-screw for actuating said carriage; means for throwing the clutch out of engagement with the means for driving the spindle; means for driving the lead-screw directly; mechanism for connecting the lead-screw and the live-spindle; a direct drive for the lead-screw; and means for connecting and disconnecting said direct drive from the lead-screw, whereby said spindle may be driven from the lead-screw, or the lead-screw may be driven from the spindle.

22. The combination, with a tool-carriage, of a lead-screw for actuating said carriage; a gear loose on the lead-screw shaft; means for connecting said gear to the lead-screw shaft; a shaft journaled in bearings of the frame; a gear on said shaft in engagement with said loose gear; a gear rigid with said shaft; a second shaft journaled in the frame; a movable gear on said second shaft; and means for shifting said movable gear into and out of mesh with said rigid gear.

23. The combination, with a tool-carriage, of a lead-screw for actuating said tool-carriage; a worm-wheel loose on said lead-screw; a clutch in sliding connection with the lead-screw shaft; means for shifting the clutch into engagement with the worm-wheel; means controlled by the carriage for disconnecting the clutch from the worm-wheel; a worm for driving said worm-wheel; means for actuating the worm; a work-supporting spindle; and means connecting the spindle and lead-screw, means for driving the spindle; and a clutch for connecting said means to the spindle when it is desirable to drive the lead-screw from said spindle.

24. The combination, with a carriage, of a lead-screw for actuating said carriage; gearing for driving said lead-screw; a clutch for connecting an element of said gearing to the lead-screw; means for manually shifting said clutch; a shifting-rod; a stop on said shifting-rod; a device on the carriage for engaging said stop; a pivoted lever having a rack; a link connecting said lever to the shifting-rod; cam mechanism actuated by the rack; and means for connecting said cam mechanism with the clutch.

25. The combination, with a carriage, of a lead-screw for actuating said carriage; gearing for driving said lead-screw directly; a clutch for connecting an element of said gearing to the lead-screw shaft; a shifting-rod; a stop adjustable on said rod; a pivoted lever having a rack; a link adjustably connected to said lever and also connected to the shifting-rod; cam mechanism actuated by the rack on the lever; and means controlled by said cam mechanism for shifting said clutch.

26. The combination, with a tool-carriage, of a lead-screw for actuating said carriage; gearing for directly driving the lead-screw; a clutch in said gearing; means for actuating the clutch to connect an element of said gearing to and disconnect it from the lead-screw; a live-spindle; reversely-driven elements loose on said spindle; a clutch for connecting either of said elements to the spindle; means for actuating said clutch; and gearing connecting the live-spindle and lead-screw.

27. The combination, with a live-spindle, of reversely-driven elements loose on said spindle; a clutch in sliding engagement with the spindle; means for actuating said clutch; a lead-screw; gearing connecting the lead-screw and live-spindle; a device for locking the clutch-actuating means to prevent its movement when the clutch is in its intermediate position; a shifting-rod; a stop adjustable on said shifting-rod; a tool-carriage; a device on the tool-carriage for engaging the stop; gearing for driving the lead-screw directly; a clutch for connecting an element of said gearing to and disconnecting it from the lead-screw shaft; a lever; means for connecting said lever with the shifting-rod; and means actuated by the lever for shifting the clutch in the gearing for actuating the lead-screw.

28. The combination, with a carriage, of a lead-screw, a gear loose on the lead-screw shaft, and having a clutch-surface; means for actuating said gear; a sleeve having a clutch-surface adapted to engage the corresponding surface of the gear, said sleeve being in sliding engagement with the lead-screw shaft; a bell-crank, one arm of which is connected to the sleeve; a rod pivoted to the other arm of the bell-crank; a support; a cam having a tubular hub fitted in said support; a rotary cam having its face in engagement with the stationary cam; and means for actuating said rotary cam.

29. The combination, with a carriage, of a lead-screw; a worm-gear loose on the lead-screw shaft, and having a clutch-surface in its side; a worm in engagement with the worm-wheel; means for rotating the worm; a sleeve having a clutch-surface at its end, said sleeve being in sliding engagement with the lead-screw shaft; a pivoted two-arm lever, one arm of which is in engagement with the clutch-sleeve; a stationary cam; a rotary cam; a connection between the rotary cam and the other arm of the pivoted lever; and means for actuating said rotary cam.

30. The combination, with a carriage, of a lead-screw; a gear loose on the lead-screw shaft; means for rotating said gear; a clutch for locking said gear to the lead-screw shaft; a stationary cam; a rotary cam; means actuated by the rotary cam for operating the clutch; and means controlled by the carriage for actuating said rotary cam.

31. The combination, with a carriage, and with a lead-screw for actuating the same, of a gear loose on the lead-screw shaft, said gear having a clutch-surface; means for driving said gear; a clutch in sliding engagement with the lead-screw shaft; means for shifting said clutch into engagement with the gear; a pair of cams, one of which is stationary and the other rotary; gearing for actuating the rotary cam; means actuated by said rotary cam for shifting the clutch out of engagement with the gear on the lead-screw shaft; and mechanism controlled by the carriage for actuating said rotary cam.

32. The combination, with a carriage, and with a lead-screw for actuating said carriage, of a worm-gear loose on the lead-screw shaft; a pair of cams, one of which is rotary and the other stationary; a pinion for actuating the rotary cam; a clutch; connections between said clutch and the rotary cam; a pivoted lever having a rack in engagement with the pinion for actuating the rotary cam; a shifting-rod connected to the pivoted lever; an adjustable stop on said rod; and a device on the carriage for engaging said stop.

33. The combination, with a carriage, and with a lead-screw for actuating the same, of a worm-gear loose on the lead-screw shaft; a clutch in shifting engagement with said lead-screw shaft; a lever for shifting the clutch to connect it with and disconnect it from the worm-gear; a rod connected to said lever; a rotary cam for shifting the rod; a stationary cam with which the rotary cam coöperates; and means for actuating the rotary cam.

In testimony whereof I affix my signature in presence of two witnesses.

BENGT M. W. HANSON.

Witnesses:
H. E. BAILEY,
N. S. BATES.